Figure 2:
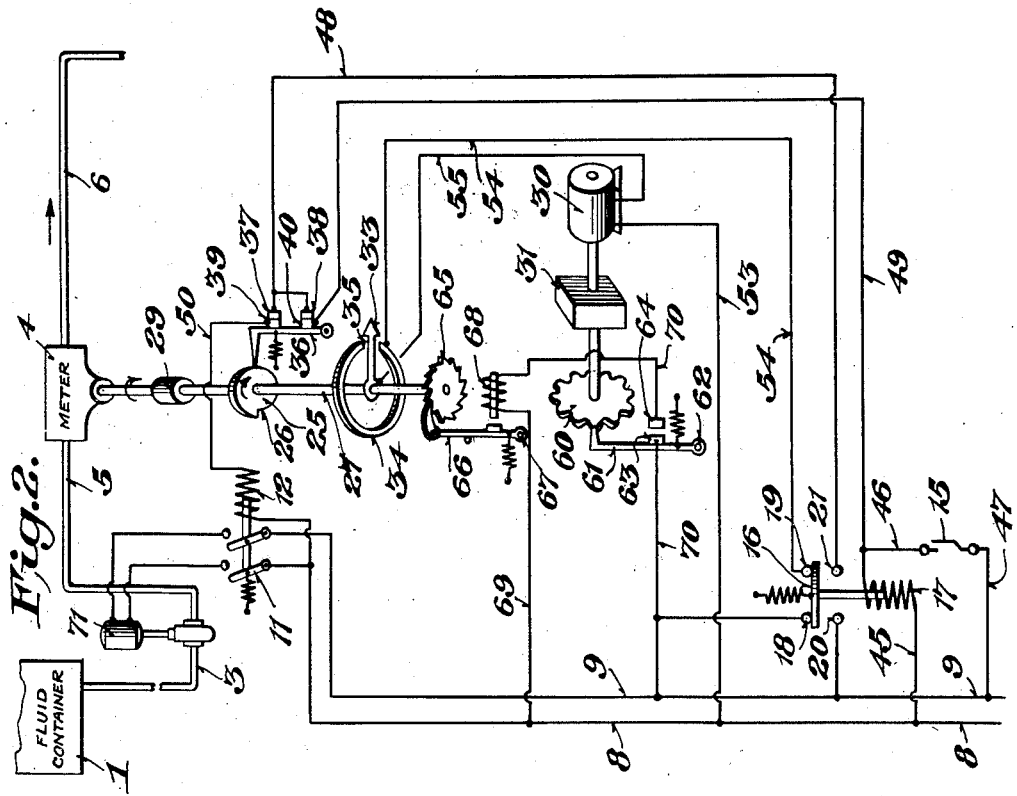

Oct. 23, 1934.  E. STAEGEMANN  1,977,781
DISPENSING APPARATUS
Filed Feb. 5, 1934  2 Sheets-Sheet 1

Inventor
Eugene Staegemann,
By K. P. McElroy
Attorney

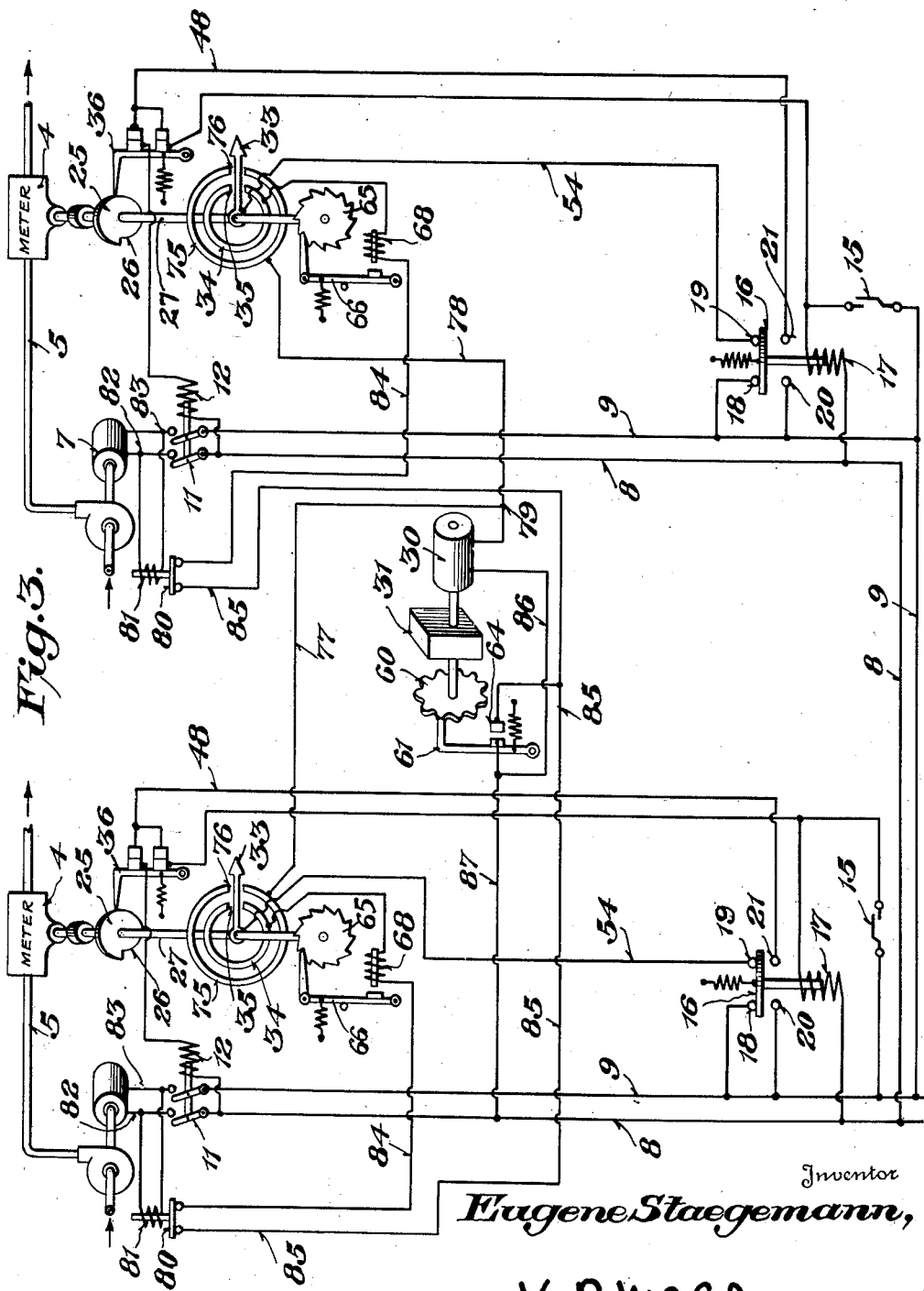

Patented Oct. 23, 1934

1,977,781

UNITED STATES PATENT OFFICE 1,977,781

DISPENSING APPARATUS

Eugene Staegemann, Allendale, N. J., assignor to The Permutit Company, New York, N. Y., a corporation of Delaware Application February 5, 1934, Serial No. 709,865

8 Claims. (Cl. 221—101)

This invention relates to dispensing apparatus; and it comprises apparatus for automatically dispensing metered quantities of fluent materials such as gas, water or the like, said apparatus comprising a meter adapted to measure a flow of fluent materials, electrically operable means adapted upon actuation to start a flow of materials to the meter, two switches, and electrical connections between the switches, the flow starting means and a source of current, one switch being adapted when in closed position to actuate the flow starting means and the other switch being operable by the meter and being adapted after passage of a predetermined quantity of fluid through the meter to deactuate the flow starting means, means for resetting the meter switch and switch means in the electrical connections to close the first switch and thus to start the flow; all as more fully hereinafter set forth and as claimed.

It has been a desideratum in the art to which this invention relates, to provide a dispensing device which will measure out or dispense a predetermined quantity of fluent material upon actuation by a remote instantaneous (push button type) switch or by a coin controlled relay or the like; the dispensing device upon completion of a dispensing operation automatically shutting off the supply and coming back to a position ready for another operation. The utility of such a device in coin controlled gasoline pumps and coin controlled water meters as well as in industrial process operations is evident. Many dispensing systems have been proposed with these objects in view, but in general they are of such complicated nature, requiring careful adjustment and maintenance, that they have not come into as wide use as might be. Gasoline dispensing for instance, is still a manual operation.

In the present invention I have provided an improved dispensing apparatus adapted to be put into operation by a remote push button switch or coin controlled relay, and upon actuation to dispense a metered quantity of fluent material. When the predetermined quantity has been dispensed, the apparatus automatically resumes its initial position, ready for another operation. I attain these results in a simple way by providing pump or valve means for initiating a flow of a fluent material upon actuation from a remote point, a meter for the flow, a meter operated switch for shutting off the flow after passage of the desired quantity of material, and means for resetting the meter switch to bring the apparatus into position ready for repeating the operation. I have further provided a system for interlocking two or more dispensing devices, wherein one central resetting means is adapted to reset the meter switches on all of several dispensing devices.

In the accompanying drawings I have shown, more or less diagrammatically, dispensing apparatus within my invention. In this showing, Fig. 1 is a diagrammatic view of one form of fluid dispensing device having a direct connected resetting motor.

Fig. 2 is a view of a modified form of dispensing device, having magnetic pawl resetting means, Fig. 3 is a view of an interlocking system comprising two dispensing devices and a single, central resetting motor.

Figure 1:
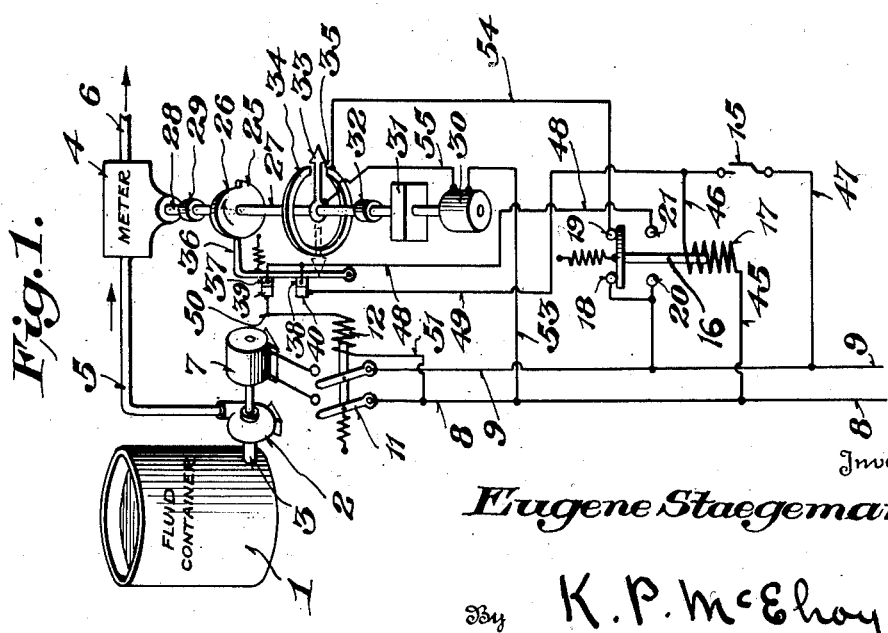

The dispensing device shown in Fig. 1 is particularly adapted for dispensing liquids. The fluid system comprises a container 1 for liquid, a pump 2 connected to the container by means of a conduit 3, and a meter 4, advantageously of the rotary type, connected to the pump outlet by a conduit 5 and to a point of use (not shown) by a conduit 6. The pump is arranged to be driven by a motor 7, connected to a power line having wires 8 and 9. A magnetic switch 11 normally held open by a spring and provided with a solenoid 12 is interposed in the motor circuit as shown. When the motor is running, liquid is pumped through the meter to the point of use. The apparatus is shown in idle position, all parts being stationary.

The control for causing the motor to start and for cutting off the flow after passage of a predetermined quantity of liquid comprises a push button type switch 15, a magnetic relay switch 16 normally held in the position shown by a spring and having a solenoid 17 and four contact points 18, 19, 20 and 21; and a meter switch and switch resetting system comprising a circular cam 25 having a depressed notch or flattened portion 26, on a cam shaft 27 driven by the meter through meter shaft 28 and an over-running clutch 29. The cam shaft 27 is also arranged to be driven in the same direction by a resetting motor 30, through a speed reducing mechanism 31 and a second over-running clutch 32. A radial contacting indicator 33 is mounted on the cam shaft as shown and is adapted to engage an annular contact strip 34 in certain angular positions of the indicator. The contact strip has a small open segment as at 35. When the dispensing system is idle, the indicator is adapted to rest at the open segment, as shown, out of contact with the contact strip. A normally closed cam operated switch 36 engages cam 25 and is held thereagainst by a spring as shown. The switch is provided with two contact elements 37 and 38 adapted to make contact with two corresponding stationary contact elements 39 and 40, as shown. Normally the switch is held closed by the cam, but in one angular position the notched portion 26 of the cam comes opposite the switch, allowing the switch to open.

The electrical circuits are best described in taking up the operation of the dispensing apparatus. Upon momentarily closing the push button switch 15, a circuit is completed through line 45, solenoid 17, line 46, switch 15, and lines 47 and 9, energizing solenoid 17 of the relay switch 16. The relay switch then completes a circuit through line 9, points 20 and 21, line 48, cam switch contacts 38 and 40, lines 49 and 46, the solenoid 17 and lines 45 and 8; thus the relay switch stays closed after the push button switch has been released. While switch 15 is shown as a push button, it may take other forms. In a coin controlled apparatus it may be a coin-operated switch; or in chemical processing it may be a float switch.

The relay switch being closed, a circuit is established through wire 9, points 20 and 21, line 48, cam switch contacts 37 and 39, wire 50, solenoid 12 of the motor control switch, wire 51, and wire 8, thereby closing the motor control switch and starting the motor 7. Liquid is pumped through the meter. The cam shaft is rotated by the meter through clutch 29, clutch 32 slipping during this operation. Indicator 33 moves on to contact strip 34. After passage of a predetermined amount of liquid, the amount being determined by the angular setting of the cam, notch 26 of the cam comes opposite the cam switch 36, causing the switch to open. This breaks the pump motor control switch circuit through contact points 39 and 40, causing the pump motor to stop. At the same time the relay solenoid circuit is broken through contact points 40 and 38, deenergizing the solenoid 17 and allowing the solenoid relay switch to resume its initial or zero position, closing contact points 18 and 19.

The resetting mechanism now comes into play. At the time of stoppage of the pump motor, indicator 33 is resting on contact strip 34, as in the position shown in dotted lines in Fig. 1. Relay switch 16 upon resuming its initial position completes a circuit through wires 8 and 53, the resetting motor 30, wire 55, indicator 33 and contact strip 34, wire 54, contact points 18 and 19, and wire 9, starting the resetting motor. The resetting motor 30 turns the cam shaft in the same angular direction as the rotation of the meter, through clutch 32. Clutch 29 slips during this operation. The motor continues to rotate the cam shaft until indicator 33 slips off the contact strip 34 and enters the open segment 35. This position corresponds to the initial position of the apparatus. Thereupon the circuit through the resetting motor is broken, and the resetting motor stops, leaving all parts of the system stationary and restored to initial position. Upon momentarily closing the push button switch the cycle described is repeated.

The system described can be embodied in various kinds of dispensers. For example, the apparatus may be a coin operated gasoline pump, adapted to automatically meter out a predetermined quantity of gasoline upon insertion of a coin. Or the meter may be a gas meter, and a solenoid operated valve substituted for the motor and pump, and a coin-controlled switch be provided at 15, thereby forming a coin controlled gas metering device.

Fig. 2 shows a modified form of the apparatus of Fig. 1, employing an electromagnetic pawl resetting device, the resetting motor in this case not being directly connected to the cam shaft. The reset motor 30 drives a multilobe cam 60. A contactor switch 61 pivoted as at 62 and having a contact point 63 cooperating with a stationary contact point 64 is adapted to engage the cam 60. Upon rotation of the cam the switch is alternately opened and closed. The cam shaft 27 is provided with a ratchet wheel 65 as shown, adapted to be rotated in steps by an electromagnetic pawl 66 pivoted as at 67 and actuated by a solenoid 68. The solenoid is connected across the power line 8, 9 in series with switch 61 by means of wires 69 and 70.

In this modification I have shown an alternative liquid supply system, in which the source of liquid is under pressure as in the elevated container 1, and the supply pump and motor are replaced by a single solenoid operated valve 71, openable upon energization of the solenoid. The solenoid 71 may be directly connected to switch 36, if desired.

In operation the dispensing is started as in the apparatus of Fig. 1, and liquid is dispensed until cam operated switch 36 opens and the circuit through solenoid valve 71 is broken; relay solenoid 17 also being deenergized. The relay upon being released establishes a circuit through the resetting motor 30 as in the case of the apparatus of Fig. 1, and switch 61 is alternately opened and closed by cam 60, actuating pawl 66 by solenoid 68. The cam shaft is turned stepwise rapidly back to open circuit position, when the indicator 33 drops into open segment 35 and all circuits are broken.

In the case of a single dispenser, the electromagnetic pawl resetting arrangement is advantageous in some relations where a particularly rapid resetting of the system is desired, because it allows of a high rate of resetting without any danger of the meter switch being over-run. If the cam shaft were adapted to be run at the same speed as the resetting motor, for instance, or through low ratio speed reducing mechanism, the momentum of the motor armature or other rotating parts, might carry the indicator 33 past the open segment 35. This cannot occur with the pawl resetting means, which is relatively light in weight and which, in operation, moves through only a short distance. Another advantage of this arrangement is that a small resetting motor may be used, merely powerful enough to operate the cam switch 60—61. This is important in large installations.

In the case of an organization of a plurality of units, the electromagnetic pawl resetting system is advantageous in that one resetting motor may be used to control the resetting of all the units.

In Fig. 3, I have shown an interlocked system comprising two units of the general type shown in Fig. 2, provided with a single central resetting control. This arrangement is useful when several dispensing units are employed in a single installation, as for example a battery of gasoline pumps at a service station or a battery of liquid dispensing devices in a water treatment plant. The system illustrated makes it possible to control the resetting of a number of dispensing units from a single central control, avoiding the necessity for providing separate resetting motors in each dispensing unit. The showing is for a double system, but with simple modification three or more dispensing units can be combined for central resetting control.

As shown, in each unit a second annular contact strip 75 is mounted about cam shaft 27 adjacent contact strip 34 and concentric therewith. Strip 75 has an open segment or gap 76 angularly corresponding to gap 35 in strip 34. Strips 75 of both units are interconnected through wires 77 and 78, with connection to the resetting motor 30 as at 79. Strips 34 of each unit can be connected to each other directly through solenoids 68; but in most cases it is desirable to interpose interlocking switch means in order to prevent premature resetting of either dispensing unit, as will be described. Such interlocking switch means comprise, as shown, a normally closed electromagnetic switch 80 in each unit, having a solenoid 81. The solenoid is connected across the dispensing motor circuit as at 82 and 83, and the switch 80 of each unit is connected in series with the solenoid 68 of the same unit, through wires 84, the two switches 80 being interconnected by wire 85, as shown. As stated, one terminal of resetting motor 30 is connected to contact strips 75 of each unit; the other terminal being connected directly to power line 8 through wires 86 and 87. Cam operated switch 61 is connected in series with the solenoid switches 80, through wires 85 and 87 as shown.

In operation, each dispensing unit is adapted to function independently of the other. Upon momentarily closing switch 15 of either unit, a predetermined quantity of liquid is dispensed from a source (not shown) which may be common to all units, the dispensing operation being terminated when cam operated switch 36 is opened by cam 26. Relay switch 16 then resumes its normal position, and the resetting motor 30 acts to reset the cam shaft.

The purpose of the interlocking switches is to prevent one unit from being prematurely reset before it has completed its dispensing operation, in case the two units should be started simultaneously or close together. When the motor 7 or valve 71 in the liquid supply line is energized, solenoid 81 of the same unit is energized and switch 80 is held open, which keeps the circuit of cam switch 61 open and prevents the resetting mechanism from functioning, until the end of the dispensing operation, when the supply motor is shut off, and switch 80 allowed to close. With this arrangement, when both units are dispensing at the same time, the first one to complete the dispensing operation sets the resetting motor 30 in operation, resetting that unit; while resetting action is deferred in the second unit by reason of its switch 80 being open, until the second unit has completed its dispensing operation.

The speed at which the resetting motor and the pawl serve to reset the meter switch, is ordinarily greater than the speed at which the meter turns the meter switch. In some cases it is useful to make the resetting speed less than the meter switch speed, in which case the interlocking switches 80 can be dispensed with, and solenoids 68 connected directly to contact 64 of the resetting motor cam switch. Adjustment of the resetting speed can be made in several ways, as by providing a different gearing ratio in the speed reducer 31, or by using different numbers of lobes on cam 60. Ordinarily resetting motor 30 takes the form of a synchronous (constant speed) motor; but speed constancy of high precision is not necessary in the apparatus, and any motor capable of a reasonably constant speed can be utilized.

The system shown in Fig. 3 is well adapted for use in a battery of automatic gasoline pumps, coin controlled beverage dispensers, or the like. The amount of liquid dispensed in one operation can readily be adjusted by varying the angular position of cam 26 on shaft 27, with respect to indicator 33. An even wider range of adjustment can be secured by interposing speed-changing gears between the meter shaft and the cam shaft 27.

In order to organize three or more dispensing units for central control it is merely necessary to connect the contact rings 75 of each additional unit to the resetting motor as at 79, similar to connections 77 and 78 for the two units of Fig. 3; and to connect the interlock relay switch 80 of each unit with the contact element 64 of cam switch 61, similar to connections 85 for the two units of Fig. 3.

While the systems diagrammed in Figs. 1 to 3 are illustrated in connection with fluid dispensing, they are readily adaptable to dispensing any sort of fluent materials, such as liquid glue, grain, tacks, or pulverulent chemicals. For such use, the meter takes a form appropriate to the material of which the flow is to be measured. The dispensing system may take the form of a screw, belt or bucket conveyor, adapted to draw from a source of supply and to deliver to a point of use. In this case supply motor 7 is the motor that runs the conveyor, and cam shaft 27 is connected through clutch 29 to a rotating shaft in the conveyor mechanism. The systems of Figs. 1 to 3 are well adapted for use in bottling apparatus, or for filling barrels, drums or the like. In combination with a suitable meter, the apparatus is adapted to dispense fluent pastes such as tooth paste, and may be used in apparatus for filling collapsible tubes with such materials.

What I claim is:—

1. Automatic dispensing apparatus for fluent materials comprising a meter adapted to measure a flow of such material, electrically operable means adapted upon actuation to establish a flow of material through the meter and to use, a switch adapted upon closing to start the flow establishing means, and means for automatically controlling the quantity of materials dispensed, said control means comprising switch means normally held closed and adapted to be opened by the meter after passage of a predetermined quantity of fluent material therethrough, and upon being so opened to deactuate the flow establishing means, power means adapted to reset the meter switch means and switch means for said power means adapted to be operated by the meter to actuate the power means and by the resetting means to deactuate the power means.

2. A dispensing apparatus comprising electrically operable means for establishing a flow of fluent material, a meter adapted to measure such flow, a meter switch operable by the meter and adapted to control said flow establishing means, electrically operable means for resetting the meter switch to original position, means adapted to energize said resetting means upon opening of the meter switch by the meter and to deenergize said resetting means upon return of the meter switch to original position, a starting switch adapted to close a circuit through the meter switch and said electrical flow-establishing means, and means for keeping said circuit closed after opening of the starting switch.

3. The apparatus of claim 2 wherein the starting switch is of the push button type.

4. Dispensing apparatus for fluent materials comprising a meter adapted to measure a flow of such materials, electrically operable means adapted upon actuation to establish a flow of material through the meter and to use, an electrically operable switch adapted upon closing to actuate the flow starting means, and means for controlling the quantity of materials dispensed, said means comprising rotary switch means normally closed and adapted to be opened by the meter after passage of a predetermined quantity of material through the meter and upon being so opened to deactuate the flow establishing means, resetting means comprising power means adapted to reset the meter switch means back to closed position ready for another cycle and a rotary switch operable by the resetting means and adapted to deactuate the resetting means upon return of the meter switch means to zero position, and means for initially and momentarily closing a circuit through the flow establishing means.

5. The apparatus of claim 4 wherein the resetting power means comprises a motor and means whereby the motor is adapted to be energized upon opening of the meter switch, the motor being adapted when energized to rotate the rotary resetting switch and the meter switch back to zero position.

6. The apparatus of claim 4 wherein the resetting power means comprises an electromagnetic pawl adapted upon actuation to rotate the meter switch and the rotary resetting switch back to zero position, a motor adapted to be actuated upon opening of the meter switch, and switch means driven by the motor and adapted to alternately actuate and deactuate, and thus to operate, the electromagnetic pawl.

7. Automatic dispensing apparatus comprising a battery of two or more dispensing units each comprising a source of fluent material, a meter adapted to measure a flow of material from the source, means for establishing a flow of material through the meter and to use, meter switch means operable by the meter and adapted to deactuate the flow-establishing means after passage of a predetermined quantity of material through the meter, switch means for initially actuating the flow establishing means, electrically operable means adapted upon actuation to reset the meter switch, and means common to all units for controlling the resetting of the meter switches of the several units, said common control means being adapted to be actuated upon opening of any one of several of the meter switches and upon actuation to energize the several meter switch resetting means.

8. Automatic dispensing apparatus comprising a battery of two or more dispensing units each comprising a source of fluent material, a meter adapted to measure a flow of material from the source, means for establishing a flow of material through the meter and to use, rotary meter switch means operable by the meter and adapted to deactuate the flow establishing means after passage of a predetermined quantity of material through the meter, switch means for initially actuating the flow establishing means, electrically operable means adapted upon actuation to rotate the meter switch back to zero position, a rotary switch mechanically connected with the meter switch and adapted to remain open in zero position of the dispensing unit and to be closed in other positions, and means common to all units for controlling the resetting of the meter switches of the several units back to zero position, said control means comprising rotary contact means adapted upon rotation to energize the several meter switch resetting means, and a motor for operating said rotary means and adapted to be energized through any one of the several rotary switches and to be deenergized by each rotary switch upon return thereof to zero position.

EUGENE STAEGEMANN.